(12) United States Patent
Hideki Di Petta et al.

(10) Patent No.: US 8,871,863 B2
(45) Date of Patent: Oct. 28, 2014

(54) PRODUCTION OF THERMOPLASTIC POLYMER MATRICES

(75) Inventors: Daniel Hideki Di Petta, Sao Paulo (BR); Karla Krivtzoff Laguens, Sao Paulo (BR); Leo Ricardo Bedore Dos Santos, Sao Paulo (BR); Tarcis Cordeiro Bastos, Sao Paulo (BR); Thomas Canova, Sao Paulo (BR)

(73) Assignee: Rhodia Poliamida e Especialidades LTDA, Sao Paulo (BR)

( * ) Notice: Subject to any disclaimer, the term of this patent is extended or adjusted under 35 U.S.C. 154(b) by 563 days.

(21) Appl. No.: 13/056,410

(22) PCT Filed: Jul. 20, 2009

(86) PCT No.: PCT/IB2009/006298
§ 371 (c)(1),
(2), (4) Date: Apr. 22, 2011

(87) PCT Pub. No.: WO2010/013107
PCT Pub. Date: Feb. 4, 2010

(65) Prior Publication Data
US 2011/0190443 A1 Aug. 4, 2011

(30) Foreign Application Priority Data

Jul. 30, 2008 (FR) ..................... 08 04335

(51) Int. Cl.
*C08K 3/34* (2006.01)
*C08F 2/44* (2006.01)
*C08F 2/20* (2006.01)
*C08K 3/30* (2006.01)

(52) U.S. Cl.
CPC ... *C08F 2/44* (2013.01); *C08F 2/20* (2013.01); *C08K 3/30* (2013.01); *C08K 3/34* (2013.01)
USPC ............ 524/789; 106/461; 106/466; 106/482

(58) Field of Classification Search
CPC .............. C08K 3/34; C04B 14/00; C08F 2/44
USPC ......................................... 524/423
See application file for complete search history.

(56) References Cited

U.S. PATENT DOCUMENTS

| 3,397,171 A | 8/1968 | Iler | |
|---|---|---|---|
| 3,511,801 A | 5/1970 | Meelheim | |
| 6,071,988 A * | 6/2000 | Barbee et al. | 523/210 |
| 6,869,681 B2 * | 3/2005 | Okamoto et al. | 428/373 |
| 7,803,863 B2 | 9/2010 | Pavez Aranguiz | |
| 2003/0102594 A1 * | 6/2003 | Choi | 264/211 |
| 2004/0068089 A1 * | 4/2004 | Charbonneaux et al. | 528/287 |
| 2008/0161482 A1 * | 7/2008 | Ko | 524/556 |

FOREIGN PATENT DOCUMENTS

| DE | 19959916 A1 | | 7/2000 |
|---|---|---|---|
| FR | 1389371 | | 2/1965 |
| JP | 2001-302896 A | | 10/2001 |
| JP | 2004-514182 A | | 6/2004 |
| JP | 2005-120364 A | | 5/2005 |
| TW | 584681 | | 4/2004 |
| WO | WO 01 12678 | * | 2/2001 |
| WO | WO 01/12678 A1 | | 2/2001 |
| WO | 02/30994 A1 | | 4/2002 |
| WO | WO 2008/058429 A1 | | 5/2008 |

OTHER PUBLICATIONS

International Search Report corresponding to PCT/IB 2008/006298 mailed Sep. 24, 2009.

* cited by examiner

*Primary Examiner* — Doris Lee
(74) *Attorney, Agent, or Firm* — Dentons US LLP

(57) ABSTRACT

A method for producing a thermoplastic polymeric matrix includes adding a suspension containing a silicate compound and/or barium sulfate either before or during the polymerization of the polymerizable polymeric matrix; various articles are obtained by forming this polymeric matrix, such as yarns, fibers, filaments, films and molded articles.

19 Claims, No Drawings

PRODUCTION OF THERMOPLASTIC POLYMER MATRICES

CROSS-REFERENCE TO PRIOR APPLICATIONS

This application is the National Stage of PCT/IB 2009/006298, filed Jul. 20, 2009 and designating the United States (published in the French language on Feb. 4, 2010, as WO 2010/013107 A1; the title and abstract were also published in English), and claims priority of FR 0804335, filed Jul. 30, 2008, each hereby expressly incorporated by reference in its entirety and each assigned to the assignee hereof.

The present invention relates to a method for producing a thermoplastic polymeric matrix by adding a suspension containing a silicate compound and/or barium sulphate during the polymerization of said polymeric matrix. The invention also relates to various articles obtained by forming this polymeric matrix, such as yarns, fibres, filaments, films and moulded articles.

The applicant has developed a method for producing a thermoplastic polymeric composition by adding a suspension containing at least one compound chosen from inorganic silicate fillers and barium sulphate during the polymerization of said polymeric matrix.

The method of the invention makes it possible in particular to obtain a very good dispersion and distribution of the silicate compound and/or barium sulphate in the thermoplastic polymer. Moreover, the introduction of silicate compound and/or barium sulphate into the synthesis makes it possible to prevent the formation of agglomerates of silicate compound and/or barium sulphate in the polymeric matrix, which creates certain problems of degradation during the production of the polymer and/or the forming thereof, in particular in the textile field. Specifically, the introduction of the silicate compound and/or barium sulphate into the synthesis enables good dispersion of the particles of silicate compound and/or barium sulphate in the matrix, thereby preventing obstruction of the die holes and of the filtration media. This previously led to an increase in spinning-pack pressure and breaking of the yarns, fibres and/or filaments obtained.

The silicate compounds, in particular tourmaline, and barium sulphate also have the advantage of being relatively inert and of not reacting with the polymeric matrix. Thus, the silicate compound and/or barium sulphate do not cause problems of degradation, colouring or yellowing of the articles obtained. The silicate compounds, in particular tourmaline, and the barium sulphate also make it possible to comply with the desired properties in terms of cost, and of ease of use and of introduction into polymeric matrices, such as thermoplastic matrices. The silicate compounds, in particular tourmaline, and also the barium sulphate, also exhibit properties of absorption and emission in the infrared region, and they make it possible to reduce friction between the spinning members and the yarns, without rendering the polymeric composition matt.

The first subject of the present invention is a method for producing a composition based on a thermoplastic polymeric matrix containing at least one compound chosen from inorganic silicate fillers and barium sulphate, characterized in that a suspension containing at least the compound is introduced before or during the polymerization of said polymeric matrix.

The present invention also relates to a thermoplastic polymeric matrix that can be obtained by means of the method described above.

When several compounds are used, the various compounds may be introduced in the form of a suspension containing all the compounds, or in the form of several suspensions each containing one compound.

The inorganic silicate filler is advantageously chosen from actinolite, tourmaline, serpentine, kaolin and other aluminosilicates. It is preferably tourmaline.

The thermoplastic polymeric matrix may be chosen from the group comprising: polyamides; polyesters; polyvinyls; polyvinyl chlorides; polyvinyl acetates; polyvinyl alcohols; acrylic polymers such as the PMMA, SAN or ABS copolymers; polyolefins such as polyethylene, polypropylene and polybutylene; cellulosic derivatives such as cellulose acetate, cellulose ester plastics; polyurethanes; copolymers thereof and/or blends thereof.

As thermoplastic polymer, preference is in particular given to polyamides, such as polyamide 6, polyamide 6.6, polyamide 11 or polyamide 12; and polyesters, such as polyethylene terephthalate (PET), polybutylene terephthalate (PBT), polytrimethylene terephthalate (PTT), copolymers thereof and/or blends thereof. As preferred polymers of the invention, mention may be made of semicrystalline or amorphous polyamides and copolyamides, such as aliphatic polyamides, semi-aromatic polyamides, and more generally linear polyamides obtained by polycondensation between an aliphatic or aromatic, saturated diacid and an aromatic or aliphatic, saturated primary diamine, polyamides obtained by condensation of a lactam, of an amino acid, or linear polyamides obtained by condensation of a mixture of these various monomers. More specifically, these polyamides may, for example, be hexamethylene polyadipamide, polyphthalamides obtained from terephthalic acid and/or isophthalic acid, or copolyamides obtained from adipic acid, hexamethylenediamine and caprolactam. The compositions are preferably based on polyamide 6, polyamide 66, and blends and copolymers based on these polyamides. It may in particular be a polyamide 6.6/6 copolymer.

According to one particular variant of the invention, the thermoplastic matrix may comprise a star, tree or dendrimer type polymer, in particular those comprising branched macromolecular chains and, where appropriate, linear macromolecular chains.

The polymeric matrix may also comprise additives generally used in the field, which may, for example, be reinforcing fillers or extenders, flame retardants, UV stabilizers, heat stabilizers, pigments and lubricants.

Numerous methods for the polymerization of thermoplastic polymeric matrices known to those skilled in the art may be used according to the present invention. These methods comprise specificities depending on the polymeric matrix that it is desired to obtain.

Said suspension comprising a silicate compound and/or barium sulphate is preferentially introduced into the polymerization medium before the polymerization has probably started or else when the polymerization has already begun, in particular when the polymer has a low degree of polycondensation.

For the production of polyamide 66, the polymerization may comprise, according to the standard method, a salt N concentration step and a polycondensation step comprising the following phases: a pressurized distillation phase, a decompression phase, a finishing phase, and, optionally, an extrusion or forming phase. The suspension containing a silicate compound and/or barium sulphate is preferentially added during the pressurized distillation phase.

For the production of polyamide 6, the polymerization may comprise a step of mixing molten caprolactam with water and, optionally, chain limiters, a heating step, optionally a pressure increase step followed by a decompression step, optionally a vacuum finishing step, an extraction step and a drying step. In the case of polyamide 6, the suspension containing a silicate compound and/or barium sulphate is preferentially added during the initial step of mixing molten caprolactam with water and optionally chain limiters.

For the production of a polyester, the polymerization may comprise a blending step, a transesterification or esterification step, optionally a concentration step, and a vacuum polycondensation step. In the case of a polyester, the suspension containing a silicate compound and/or barium sulphate is preferentially added before or just before the polycondensation phase.

The suspension of the invention may comprise, in addition to a silicate compound and/or barium sulphate, water and/or at least one compound chosen from the group comprising: surfactants, organic solvents and/or polymeric matrix monomers. A suspension comprising at least one silicate compound and/or barium sulphate, water and a surfactant is in particular preferred.

The suspension is called an aqueous suspension when it comprises predominantly water. An aqueous suspension may also comprise one or more other compounds mentioned above. Suspensions which do not comprise water, but which comprise another liquid, for instance an organic solvent and/or a polymeric matrix monomer, such as ethylene glycol, may also be used.

The suspension may thus comprise surfactants, such as anionic surfactants (polyphosphates, pyrophosphates, alkyl ester sulphonates, alkyl sulphates, alkylamide sulphates, salts of saturated or unsaturated fatty acids, etc), nonionic surfactants (polyalkoxylated alkylphenol, fatty acid, amine, fatty acid amide and amidoamine derivatives, ethylene oxide or propylene oxide condensates with ethylenediamine, alkylpolyglucosides, etc), amphoteric surfactants (alkylamphoacetates, etc) or zwitterionic surfactants (betaines). These agents may represent from 0.05% to 1%, preferably from 0.1% to 0.7%, more preferentially 0.2% to 0.5% by weight, relative to the total weight of the suspension, before settling out. The term "surfactant" is intended to mean a compound which modifies the surface tension of the suspension.

Said suspension may also comprise organic solvents, such as aliphatic or aromatic alcohols, glycol ethers (methanol, ethanol, propanol, isopropanol, propanediol, ethylene glycol, glycerol, benzyl alcohol, butoxypropoxypropanol, etc). These solvents may represent from 0.1% to 50% of the weight of the suspension.

As polymeric matrix monomers, mention may, for example, be made of caprolactam, in particular for the production of polyamides, or ethylene glycol, in particular for the production of polyesters. These monomers may in particular represent from 0.1% to 70% of the weight of the suspension, preferentially from 15% to 60%. Preferentially, the polymeric matrix monomers are those used for the production of the polymeric matrix during the polymerization phase.

The suspension comprises, in addition to a silicate compound and/or barium sulphate, preferentially water and optionally caprolactam and/or a surfactant, or preferentially water and a surfactant.

For the production of polyamide 6, an aqueous suspension comprising a silicate compound and/or barium sulphate and optionally caprolactam, and optionally a surfactant, is preferentially used. For the production of polyamide 66, an aqueous suspension comprising a silicate compound and/or barium sulphate and optionally a surfactant is preferentially used.

For the production of polyethylene terephthalate, a suspension comprising a silicate compound and/or barium sulphate in ethylene glycol and optionally a surfactant is preferentially used.

According to the invention, the silicate compound and/or barium sulphate may be in the form of particles comprising at least one silicate compound and/or barium sulphate. Preferentially, the silicate compound and/or barium sulphate is (are) in the form of particles constituted essentially of crystals of silicate compound and/or barium sulphate, optionally coated with at least one inorganic and/or organic compound.

The particles of tourmaline and/or of barium sulphate may have an average diameter (d50) of less than or equal to 2 µm, preferentially less than or equal to 0.8 µm, more preferentially from 0.1 to 0.5 µm, and in particular an average diameter of approximately 0.3 to 0.5 µm.

The suspension may comprise from 5% to 50% by weight of silicate compound and/or barium sulphate, preferentially from 10% to 40%, relative to the total weight of the suspension.

The proportion by weight of silicate compound and/or barium sulphate relative to the total weight of the polymeric composition may be from 0.01% to 10%, preferentially from 0.05% to 7%, even more preferentially from 0.1% to 5%, particularly from 0.2 to 3%.

Said suspension may be produced by means of a method comprising at least the following steps:
  a) at least one silicate compound and/or barium sulphate is brought into contact with water and/or at least one compound chosen from the group comprising: surfactants, organic solvents and/or polymeric matrix monomers;
  b) the mixture obtained in step a) is stirred so as to homogenously disperse the silicate compound and/or barium sulphate in the water, in particular so as to reduce the size of the agglomerates; and
  c) the suspension obtained is filtered using a filter with a pore size of at least 10 µm, preferentially of at least 5 µm, more preferentially of at least 3 µm.

The expression "filter with a pore size" is intended to mean a filter which does not allow particles having a diameter greater than a value in µm to pass through. For example, a filter with a pore size of 1 µm does not allow particles having a diameter greater than 1 µm to pass through.

It is in particular possible to dilute the suspension or to let the suspension settle out during the production process.

Preferentially, the suspension is filtered several times in step c), in particular by making it pas through several filters placed in series and by using a recirculation loop. A 10 µm filter and a 5 µm filter can in particular be placed in series, with the suspension being made to circulate in the loop for a few hours. Several identical or different circulation loops can also be placed in series.

The presence of silicate compound and/or barium sulphate in a polymeric matrix may be determined by various methods well known to those skilled in the art, such as thermogravimetric analysis (ash method), or by qualitative direct analysis of the elements, for example barium, by X-ray fluorescence spectrometry, optionally followed by quantitative elemental assay of the element (for example, barium) after sulphonitric mineralization by atomic spectrometry, in such a way as to deduce therefrom the amount of compound. It is also possible to quantitatively determine the element (for example, barium)

by microanalysis and/or to dissolve the polymeric matrix in a solvent, to filter out the additive and to analyse it by X-ray diffraction.

The present invention also relates to the use of the composition based on a thermoplastic matrix containing a silicate compound and/or barium sulphate, for the production of articles, such as yarns, fibres and/or filaments, films and moulded articles. The compositions may be formed into articles directly after polymerization, without intermediate solidification and remelting steps. They may also be formed into granules, intended to undergo remelting for subsequent definitive forming, for example for the production of moulded articles or for the production of yarns, fibres and/or filaments.

All the methods of melt spinning may be used, in particular by making the composition of the invention pass through spinnerets comprising one or more orifices.

For the production of multifilament yarns, mention may be made of the methods of spinning or spin-drawing or spin-draw-texturing, which may or may not be integrated, whatever the spinning speed may be. Yarns may be produced by high speed spinning, at a spinning speed of greater than or equal to 3000 m/min, preferentially greater than or equal to 4000 m/min. Such methods are often denoted by the following terms: POY (partially oriented yarn), FOY (fully oriented yarn), ISD (integrated spin-drawing) and HOY (highly oriented yarn with a speed of greater than 5500 m/min). These yarns may also be textured, depending on the use for which they are intended. The yarns obtained by these methods are most particularly suitable for the production of woven or knitted textile surfaces.

According to the invention, the thermoplastic polymeric matrix may be used for producing multifilament yarns having a linear density of less than or equal to 6 dtex/filament, more preferentially less than or equal to 1.5 dtex/filament.

For the manufacture of fibres, the filaments may, for example, be joined together in the form of a strand or a lap, directly after spinning or in a subsequent operation, drawn, textured or crimped and cut. The fibres obtained may be used for the production of nonwovens or staple fibre yarns. The compositions may also be used for the production of flocking.

The yarns, fibres and/or filaments of the invention may undergo various treatments, such as, for example, drawing in one continuous step or in a subsequent operation, deposition of sizing agent, oiling, braiding, texturing, crimping, drawing, setting or relaxing heat treatment, throwing, twisting, and/or dyeing. For dyeing, mention may in particular be made of bath or jet dyeing processes. The preferred dyes are metalliferous or nonmetalliferous acid dyes.

The present invention also relates to an article obtained at least from yarns, fibres and/or filaments as defined above. These articles may be fabrics or textile surfaces, such as woven, knitted, nonwoven or rug-like surfaces. These articles may, for example, be carpets, rugs, furniture coverings, surface coverings, sofas, curtains, bedding, mattresses and pillows, clothing and medical textile materials.

The present invention also relates to articles obtained by forming a composition of the invention by means of a process chosen from the group comprising an extrusion process, such as sheet or film extrusion, a moulding process, such as compression moulding, and an injection process, such as injection moulding.

Films can thus be obtained by means of the abovementioned processes using a sheet die. Preferentially, the thermoplastic matrix is composed of a polyamide, a polyester or a polyolefin. The films obtained can undergo one or various treatment steps, such as uniaxial or biaxial drawing, stabilizing heat treatment, antistatic treatment or sizing.

The present invention also relates to a suspension containing a silicate compound and/or barium sulphate.

The term "and/or" includes the meanings "and", "or" and also all the other possible combinations of elements connected with this term.

Other details or advantages of the invention will become more clearly apparent in view of the examples given below, strictly by way of indication.

EXAMPLES

Example 1

Preparation of a Tourmaline Suspension (Slurry)

The suspension of tourmaline at 39% was prepared in the following way:

A solution of sodium pyrophosphate in water, at a concentration of 0.18% by weight, is prepared by mixing 8.52 kg of demineralized water and 15.3 g of sodium pyrophosphate. The mixing is carried out with stirring for 15 minutes at a stirring speed of 1000 rpm, in a vessel equipped with a high-speed disperser. 10 kg of tourmaline in the form of a powder were added so as to obtain 18.5 kg of suspension at 54%. After the end of the addition, the suspension is kept stirring (2000 rpm) for 70 minutes. The suspension is then diluted by adding 7.1 kg of an aqueous solution containing 0.18% by weight of sodium pyrophosphate, so as to obtain a suspension at 39%. The 39% suspension is then transferred into a settling tank (20° C.) with a settling height of 16 cm, where it remains for 68 hours.

Example 2

PA 66 Comprising Tourmaline Introduced into the Polymerization

A copolymer based on polyamide 66 was produced from 1395.9 kg of an aqueous solution of a hexamethylenediamine adipate salt (salt N) to which 30.2 kg of caprolactam in an aqueous solution are in particular added.

The polyamide is produced according to a conventional method comprising a step of concentrating the solution in the evaporator and a step of polycondensation in an unstirred autoclave reactor, which comprises the following phases:
  a pressurized distillation phase at a static pressure of 18.5 bars,
  a decompression phase from 18.5 bar to 1 bar with a final temperature of at least 264° C.,
  a finishing phase with a final temperature of at least 268° C.,
  an extrusion phase under a nitrogen pressure of 5.5 bar.

During the pressurized distillation phase, after 10 min, the 12.5 kg of the aqueous suspension of tourmaline prepared in Example 1, and then an aqueous suspension of $TiO_2$ at 20%, are added. A copolymer based on PA 66, comprising 2.5% by weight of polyamide 6 units, is obtained.

The polymer obtained is analyzed by the usual methods and its characteristics are:
  relative viscosity=44 (at 8.4% in 90% formic acid at 25° C.)
  amine end groups=42.7 meq/kg
  carboxylic end groups=78.5 meq/kg
  tourmaline=0.2% (measured by the ash content).

Example 3

Extrusion of PA 66 with Tourmaline Introduced During Polymerization

The polyamide obtained in Example 2, having a final composition by mass of 98.3% of polyamide, 1.5% of $TiO_2$ and 0.2% of tourmaline, is remelted in a single-screw extruder and extruded at 290° C., through a filtration element. The filtration element is composed of a rep with a surface area of 2 cm² and a pore size of 18 micra, sold by the company Açoplast under the reference Y-610.

Comparative Example 4

Extrusion of PA 66 with Addition of Tourmaline Via a Masterbatch

A polyamide PA 66 containing 1.5% of $TiO_2$ produced by a method similar to that described in Example 2 is mixed with a tourmaline masterbatch (20% of tourmaline in the same polyamide 66), according to a proportion by mass of 99% of PA 66 and 1% of tourmaline masterbatch, in such a way that the final composition by mass is 98.3% of polyamide 66, 1.5% of $TiO_2$ and 0.2% of tourmaline. The mixture is then remelted in a single-screw extruder and extruded under the same conditions as in Example 3.

A filterability index F for the polyamide 66 compositions of Example 3 and Comparative Example 4, relating to filterability through the spinning pack, is determined and is calculated as follows from measured parameters (in particular the pack pressure):

$$F=(Pf-Pi)/(Mt*Pi)$$

where:

Pi is the initial pack pressure (bar)

Pf is the final pack pressure (bar)

Mt is the total mass of composition extruded.

The filterability index on the parameters measured for the compositions of Example 2 and Comparative Example 4 are given in Table 2 below:

TABLE 2

|  | Comparative Example 4 (1.5% $TiO_2$ and 0.2% tourmaline) | Example 3 (1.5% $TiO_2$ and 0.2% tourmaline) |
| --- | --- | --- |
| Pi (bar) | 46.5 | 33.21 |
| Pf-Pi (bar) | 136.95 | 13.28 |
| Mt (kg) | 2.43 | 2.79 |
| Filterability index F ($kg^{-1}$) | 1.21 | 0.14 |

A much better filterability of the composition is thus observed with the composition according to the invention, in which the tourmaline was introduced in the polymerization process, compared with the compositions in which the tourmaline was introduced by mixing with the polyamide matrix.

This better filterability makes it possible to increase the lifetime of the filters, and to improve the spinning process, by limiting the increases in spinning pack pressure, and the breaking of the filament/fibres/yarns obtained.

Example 5

Preparation of a Barium Sulphate Suspension (Slurry)

The suspension is prepared by mixing 2.13 kg of barium sulphate in the form of a powder and 8.52 kg of the solution of sodium pyrophosphate in water, at a concentration of 0.18% by weight, as prepared in Example 1. The mixture is kept stirring (1500 rpm) for 3 hours.

Example 6

Preparation of a Tourmaline and Barium Sulphate Suspension (Slurry)

The tourmaline suspension of Example 1 is diluted to 20% with a solution of sodium pyrophosphate in water, at a concentration of 0.18% by weight, as prepared in Example 1.

The suspension is prepared by mixing 20 kg of this 20% suspension and 40 kg of the barium sulphate suspension of Example 5. The mixture is kept stirring (1500 rpm) for 3 hours.

Example 7

Preparation of a Tourmaline and Titanium Dioxide Suspension (Slurry)

The tourmaline suspension of Example 1 is diluted to 20% with a solution of sodium pyrophosphate in water, at a concentration of 0.18% by weight, as prepared in Example 1.

The suspension is prepared by mixing 5 kg of this 20% suspension and 75 kg of an aqueous suspension of titanium dioxide at 20%. The mixture is kept stirring (1500 rpm) for 3 hours.

Example 8

Preparation of a Tourmaline, Barium Sulphate and Titanium Dioxide Suspension (Slurry)

The tourmaline suspension of Example 1 is diluted to 20% with a solution of sodium pyrophosphate in water, at a concentration of 0.18% by weight, as prepared in Example 1.

The suspension is prepared by mixing 60 kg of this 20% suspension, 15 kg of the barium sulphate suspension of Example 5 and 15 kg of an aqueous suspension of titanium dioxide at 20%. The mixture is kept stirring (1500 rpm) for 3 hours.

Example 9

PA 66 Comprising Tourmaline Introduced in the Polymerization

A copolymer based on polyamide 66 is produced as in Example 2, except that, after at least 10 min of pressurized distillation, the suspension of Example 7 is introduced; in place of the suspension of Example 1 and of the titanium dioxide suspension.

A polyamide comprising 1.5% of titanium dioxide and 0.1% of tourmaline is obtained.

Examples 10 to 12

PA 66 Comprising Tourmaline and Barium Sulphate Introduced in the Polymerization A copolymer based on polyamide 66 is produced as in Example 2, except that, after at least 10 min of pressurized distillation, the following are introduced in place of the suspension of Example 1 and of the titanium dioxide suspension:

Example 10: the suspension of Example 5, the suspension of Example 1 and the aqueous suspension of titanium dioxide at 20%. A polyamide comprising 1.7% of titanium dioxide, 1% of tourmaline and 0.3% of barium sulphate is obtained;

Example 11: the suspension of Example 6 and the aqueous suspension of titanium dioxide at 20%. A polyamide comprising 1.5% of titanium dioxide, 0.4% of tourmaline and 0.8% of barium sulphate is obtained;

Example 12: the suspension of Example 8. A polyamide comprising 0.3% of titanium dioxide, 1.2% of tourmaline and 0.3% of barium sulphate is obtained.

Example 13

PA 66 Comprising Tourmaline Introduced in the Polymerization and Barium Sulphate Introduced in the Extrusion A copolymer based on polyamide 66 is produced as in Example 2, except that, after at least 10 min of pressurized distillation, the suspension of Example 7 is introduced in place of the suspension of Example 1 and of the titanium dioxide suspension.

The polyamide obtained is mixed with a masterbatch of barium sulphate (40% of barium sulphate and 60% of polyamide 66), in such a way that the final composition by mass is 1.5% of $TiO_2$, 0.1% of tourmaline and 0.8% of barium sulphate. The mixture is then remelted in a single-screw extruder and extruded under the same conditions as in Example 3.

Example 14

PA 66 Comprising Tourmaline Introduced in the Polymerization and Barium Sulphate Introduced in the Extrusion A copolymer based on polyamide 66 is produced as in Example 2.

The polyamide obtained is mixed with a masterbatch of barium sulphate (40% of barium sulphate and 60% of polyamide 66), in such a way that the final composition by mass is 0.4% of $TiO_2$, 0.7% of tourmaline and 1.5% of barium sulphate. The mixture is then remelted in a single-screw extruder and extruded under the same conditions as in Example 3.

The invention claimed is:

1. A method for the production of a thermoplastic polymeric matrix having tourmaline distributed therethrough, the method comprising introducing a suspension comprising tourmaline into a material polymerizable into a thermoplastic polymeric matrix and completing polymerization of said polymerizable material, wherein said suspension comprises at least one liquid selected from the group consisting of water, an organic solvent, and a polymeric matrix monomer, and wherein said suspension comprises from 5 to 50% by weight of tourmaline, relative to the total weight of the suspension.

2. The method as defined by claim 1, wherein said suspension is introduced either before or during polymerization of said polymerizable matrix material.

3. The method as defined by claim 1, wherein the thermoplastic polymeric matrix is selected from the group consisting of polyamides; polyesters; polyvinyls; polyvinyl chlorides; polyvinyl acetates; polyvinyl alcohols; acrylic polymers; PMMA, SAN or ABS copolymers; polyolefins; polyethylene, polypropylene and polybutylene; cellulosic derivatives; cellulose acetate, cellulose ester plastics; polyurethanes; copolymers and blends thereof.

4. The method as defined by claim 1, said suspension further comprising surfactants.

5. The method as defined by claim 1, said suspension comprising water and, optionally, caprolactam and/or a surfactant.

6. The method as defined by claim 1, said suspension further comprising water and a surfactant.

7. The method as defined by claim 1, said suspension comprising water and/or caprolactam.

8. The method es defined by claim 1, the thermoplastic polymeric matrix comprising from 0.01% to 10% by weight of tourmaline.

9. The method as defined by claim 1, wherein said suspension further comprises titanium dioxide.

10. The method as defined by claim 1, wherein the tourmaline is in the form of particles consisting essentially of crystals of tourmaline, optionally coated with at least one inorganic and/or organic compound.

11. The method as defined by claim 10, wherein the particles have an average diameter (d50) of less than or equal to 2 µm.

12. The method as defined by claim 1, wherein said suspension further comprises barium sulfate.

13. The method as defined by claim 12, wherein said suspension further comprises titanium dioxide.

14. The method as defined by claim 1, wherein the thermoplastic polymeric matrix is selected from the group consisting of polyamide 6, polyamide 6.6, polyamide 11, polyamide 12, polyethylene terephthalate (PET), polybutylene terephthalate (PBT), polytrimethylene terephthalate (PTT), copolymers and blends thereof.

15. The method as defined by claim 14, comprising a polyamide 66 polymerization including a salt N concentration step and a polycondensation step which comprises the following phases: a pressurized distillation phase, a decompression phase, a finishing phase and, optionally, an extrusion or forming phase, said suspension being added during the distillation phase.

16. The method as defined by claim 14, comprising a polyamide 6 polymerization including a step of mixing molten caprolactam with water and, optionally, chain limiters, a heating step, optionally a pressure increase step followed by a decompression step, optionally a vacuum finishing step, an extraction step and a drying step, said suspension being added in the initial step of mixing molten caprolactam with water and, optionally, chain limiters.

17. The method as defined by claim 14, comprising a polyester polymerization including a blending step, a transesterification or esterification step, optionally a concentration step, and a vacuum polycondensation step, said suspension being added before or just before the polycondensation phase.

18. A thermoplastic polymeric matrix having tourmaline distributed therethrough, obtained by means of the method as defined by claim 1.

19. A shaped article comprising yarns, fibers and/or filaments, films and molded articles, shaped from a thermoplastic matrix as produced by the method as defined by claim 1.

* * * * *